US007668997B2

(12) United States Patent
Ramanujan et al.

(10) Patent No.: US 7,668,997 B2
(45) Date of Patent: Feb. 23, 2010

(54) HIGH SPEED BUS SYSTEM THAT INCORPORATES UNI-DIRECTIONAL POINT-TO-POINT BUSES

(75) Inventors: Raj Ramanujan, Leominster, MA (US); James B. Keller, Arlington, MA (US); William A. Samaras, Haverhill, MA (US); John DeRosa, Princeton, MA (US); Robert E. Stewart, Stow, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 607 days.

(21) Appl. No.: 11/152,213

(22) Filed: Jun. 14, 2005

(65) Prior Publication Data

US 2005/0232287 A1 Oct. 20, 2005

Related U.S. Application Data

(63) Continuation of application No. 08/883,118, filed on Jun. 26, 1997, now Pat. No. 6,928,500, which is a continuation of application No. 08/047,164, filed on Apr. 12, 1993, now abandoned, which is a continuation of application No. 07/546,547, filed on Jun. 29, 1990, now abandoned.

(51) Int. Cl.
*G06F 12/00* (2006.01)
(52) U.S. Cl. ........................................ 710/240; 710/241
(58) Field of Classification Search .................. 710/36, 710/38–40, 45, 113, 114, 118, 316, 317, 710/240, 241
See application file for complete search history.

(56) References Cited

U.S. PATENT DOCUMENTS

| 4,096,572 | A | | 6/1978 | Namimoto |
| 4,453,214 | A | * | 6/1984 | Adcock ...................... 710/114 |
| 4,470,114 | A | | 9/1984 | Gerhold |
| 4,504,906 | A | * | 3/1985 | Itaya et al. .................. 710/100 |
| 4,570,220 | A | | 2/1986 | Tetrick et al. |
| 4,591,979 | A | | 5/1986 | Iwashita |
| 4,737,932 | A | | 4/1988 | Baba |
| 4,807,184 | A | | 2/1989 | Shelor |
| 4,834,483 | A | | 5/1989 | Arthurs et al. |

(Continued)

FOREIGN PATENT DOCUMENTS

DE       3340123 A       5/1985

(Continued)

OTHER PUBLICATIONS

H.C.B. Chan et al., "Evaluation of reservation-arbitrated access schemes for statistical multiplexing of variable-bit-rate video traffic over dual-bus metropolitan ara networks," IEE Proc.-Commun., vol. 145, No. 3, Jun. 1998, pp. 159-167.

(Continued)

*Primary Examiner*—Khanh Dang

(57) ABSTRACT

An apparatus comprises a plurality of ports wherein each port is adapted to couple to a device. At least one port connects by way of first and second unidirectional, point-to-point communication links with a device. The first unidirectional, point-to-point communication link transfers data from the device to the central logic unit and the second unidirectional, point-to-point communication link transfers data from the central logic unit to the device.

16 Claims, 9 Drawing Sheets

U.S. PATENT DOCUMENTS

| | | | |
|---|---|---|---|
| 4,837,682 A | | 6/1989 | Culler |
| 4,982,187 A | * | 1/1991 | Goldstein et al. .......... 340/2.26 |
| 4,991,084 A | | 2/1991 | Rodiger et al. |
| 5,053,942 A | * | 10/1991 | Srini .......................... 710/317 |
| 5,072,363 A | | 12/1991 | Gallagher |
| 5,088,024 A | | 2/1992 | Vernon et al. |
| 5,168,547 A | | 12/1992 | Miller et al. |
| 5,197,130 A | * | 3/1993 | Chen et al. ..................... 712/3 |
| 5,265,257 A | * | 11/1993 | Simcoe et al. .............. 710/263 |
| 6,928,500 B1 | | 8/2005 | Ramanujan et al. |

FOREIGN PATENT DOCUMENTS

| | | |
|---|---|---|
| DE | 3935707 A | 5/1990 |
| WO | WO 8704826 A | 8/1987 |

OTHER PUBLICATIONS

X. Ningyi et al., "A SoC Communication Architecture with Fine-grained Control over Bandwidths and Latencies," 2003 5th International Conference on ASIC, vol. 1, Oct. 21-24, 2003. pp. 409-412.

J. Snell, "Exposing Application Services With SOAP," Jul. 12, 2000, 5 pp. [Online] http://www.xml.com/lpt/a/2000/07/12/soap/ms-soaptutorial.html.

Tarak Modi, "Clean up your wire protocol with SOAP, Part 1," Mar. 2001, 11 pp. [Online] http://www.javaworld.com/javaworld/jw-03-2001/jw-0330-soap_p.html.

L. Lemay et al., "Declaring Methods that Might Throw Exceptions," Teach Yourself Java 2 in 22 days, Mar. 1999, pp. 422-430.

D. Box et al., Simple Object Access Protocol (SOAP) 1.1, W3C Note May 8, 2000, 46. pp.

Dirk Reinshagen, "XML messaging, Part 1," Mar. 2001, 11 pp. [Online] http://www.javaworld.com/javaworld/jw-03-2001/jw-0302-xmlmessaging_p.html.

Digital Equipment Corporation, EPO Search Report dated Oct. 31, 1991, EPO App. No. 91110755.

\* cited by examiner

HIGH SPEED BUS SYSTEM THAT INCORPORATES UNI-DIRECTIONAL POINT-TO-POINT BUSES

CROSS-REFERENCE TO RELATED APPLICATIONS

This is a continuation of copending application Ser. No. 08/883,118, filed Jun. 26, 1997, which is a file wrapper continuation of Ser. No. 08/047,164, filed Apr. 12, 1993 (now abandoned), which is a file wrapper continuation of Ser. No. 07/546,547, filed Jun. 29, 1990 (now abandoned) which are hereby incorporated by reference herein.

BACKGROUND

The conventional approach to buses in computer systems in which the same information was transmitted to, and received from, a plurality of system elements, such as central processing units ("CPUs"), memories, or the like, was to use a multi-drop bus. A typical multi-drop bus consists of a number of bus wires that run to each element.

A beneficial aspect of a multi-drop bus is that only one bus element, such as a CPU, is allowed to transmit on the bus at a time and all bus elements can see what is being transmitted on the bus.

A drawback of the multi-drop bus is that all of the bus elements are always connected to the bus and the control of arbitration for access to the bus is predicated on separate communications between a bus element and other bus elements. This takes time and, therefore, slows down the processing speed of the system.

While multi-drop buses work well for many systems, as processing speeds increase, these bus systems have problems. These problems are a direct result of the plurality of bus elements being coupled to the same line.

In particular, devices based on ECL logic have experienced substantial problems with multi-drop bus systems. These problems have prevented such ECL based systems from operating at design speed. The result, therefore, was that in a high speed system, buses operated at a much slower speed that negated the processing speed advance endemic in these systems.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

Embodiments of the high speed bus system provide a high speed bus for use in transmitting commands and data between the processors and a shared memory in a multi-processor, shared memory system.

Figure 1:
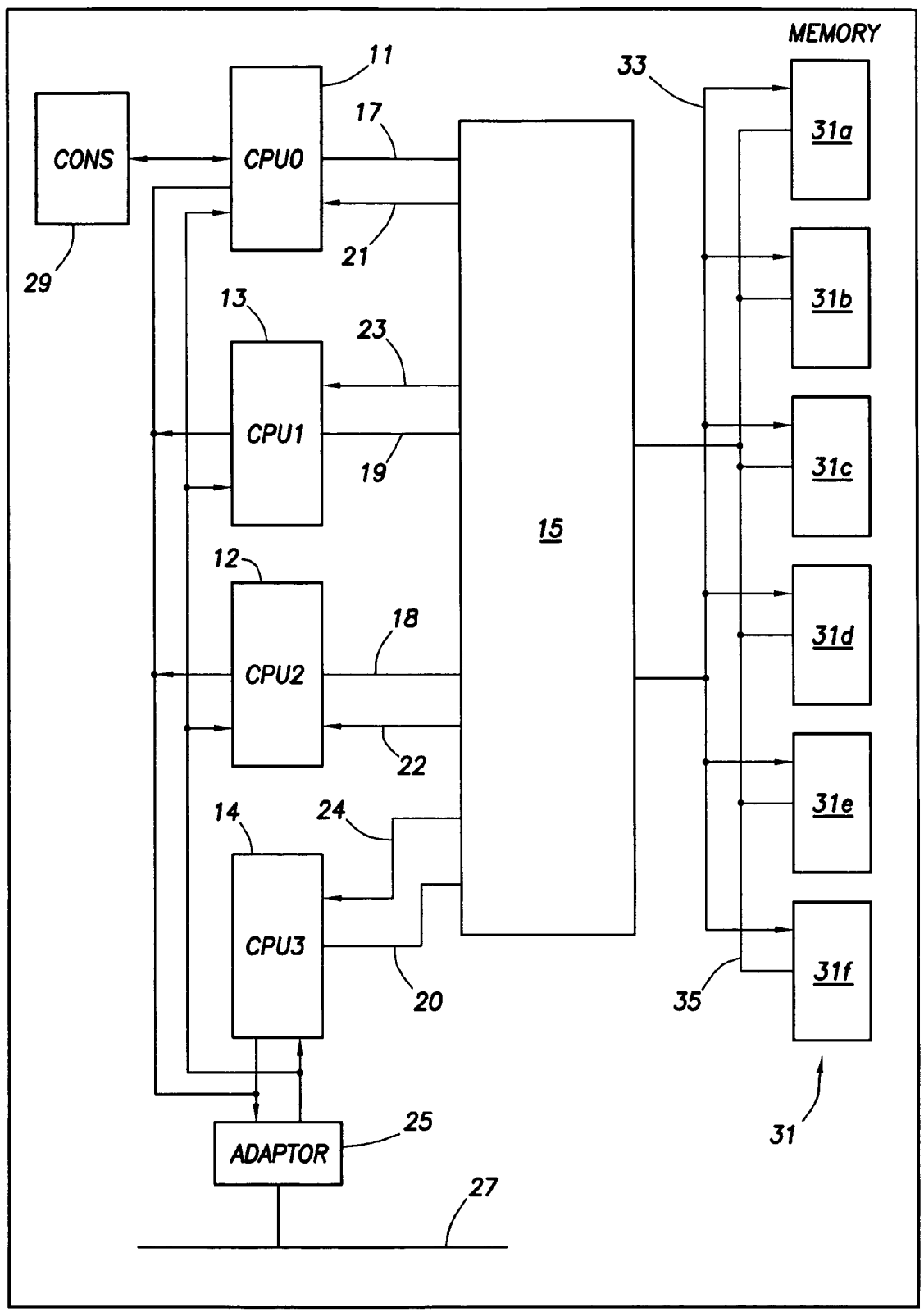
FIG. 1 is a general block diagram of a system comprising an embodiment of the high speed bus system according to the present invention.

FIG. 1 is a general block diagram of a system in which embodiments of the present invention may be implemented. This system has CPU 0 at 11, CPU 1 at 13, CPU2 at 12, and CPU 3 at 14. These CPUs are coupled to central unit 15.

Each of the CPUs is connected to the central unit 15 over a point-to-point bus. Accordingly, E-BUS 0 TA bus 17 connects CPU 0 at 11 to central unit 15, E-BUS 1 TA bus 19 connects CPU 1 at 13 to central unit 15, E-BUS 2 TA bus 18 connects CPU 2 at 12 to central unit 15, and E-BUS 3 TA bus 20 connects CPU 3 at 14 to central unit 15 (collectively, "E-BUS TA buses"). These uni-directional buses are for transmissions from the CPUs to central unit 15. For the transmission of data from central unit 15 to the CPUs, there are E-BUS 0 FA bus 21, which connects CPU 0 at 11 to the central unit, E-BUS 1 FA bus 23, which connects CPU 1 at 13 to the central unit, E-BUS 2 FA bus 22, which connects CPU 2 at 12 to the central unit, and E-BUS 3 FA bus 24, which connects CPU 3 at 14 to central unit.

Each of the CPUs also connect to an I/O bus adaptor 25 over two uni-directional buses; each is a 16-bit bus. One bus is an input bus and the other is an output bus.

As shown in FIG. 1, control console 29 is associated with CPU 0 at 11. However, it is understood that it may be associated with more than one CPU.

Central unit 15 is connected to shared memory 31 by uni-directional A-BUS FA 33 and unidirectional bus A-BUS TA 35. A-BUS FA 33 is for transmissions from the central unit to the shared memory 31. Conversely, A-BUS TA 35 is for transmissions from shared memory 31 to the central unit.

Shared memory 31 comprises memory modules which are designated 31a, 31b, 31c, 31d, 31e, and 31f. Each memory module connects to central unit 15 via A-BUS FA at 33 and A-BUS TA at 35. It is to be understood that there may be more shared memory, or there may be more or less memory modules for a single shared memory. It is further understood that each module may be of the same type of memory or each may be of a different type.

E-BUS TA buses 17, 19, 18, and 20, E-BUS FA buses 21, 23, 22, and 24, and A-BUS FA bus 33 are 32-bit parallel buses, and A-BUS TA bus 35 is a 64-bit parallel bus.

The central unit 15 performs at least two functions. First, it combines the signals input to it from the CPU and memory on the E-BUS TA and A-BUS TA buses, respectively, so that they are provided as outputs on the output buses E-BUS FA and A-BUS FA. Second, it contains a memory controller for memory modules 31*a*-31*f*. Central unit 15 also controls system timing, which is done through a central clock.

Figure 2:
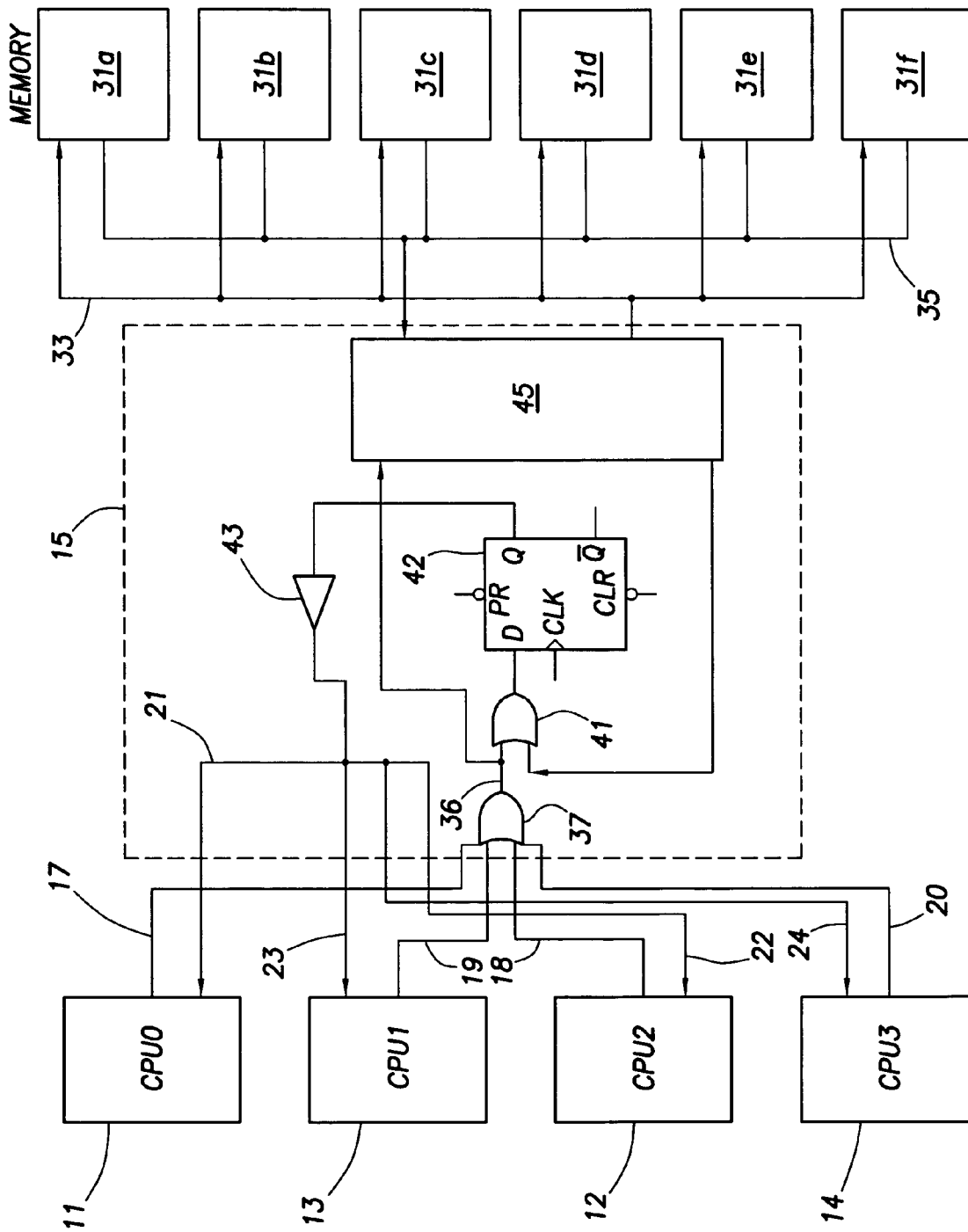
FIG. 2 is a simplified block diagram of a first embodiment using OR gates.

FIG. 2 is a block diagram of the system shown in FIG. 1. In this implementation, OR gates are used to combine the point-to-point signals from E-BUS TA buses 17, 19, 18, and 20 into a common signal.

As shown in FIG. 2, the 32-bit wide E-BUS TA buses 17, 19, 18, and 20 connect to the series of OR gates 37 and 41. For simplicity of description, only single lines are shown for the 32-bit wide buses and only one series of OR gates are shown for handling these buses. It is understood, however, that in some embodiments there would be 32 series of OR gates 37 and 41 to accommodate the 32-bits of the buses. It is further understood that the single 32-bit wide output of OR gate 37 is input to memory controller 45 and OR gate 41, and the single 32-bit wide output of OR gate 41 is input to state device 42.

According to this implementation, E-BUS 0 TA 17 from CPU 0 at 11 connects to a first input to OR gate 37, E-BUS 1 TA bus 19 from CPU 1 at 13 connects to the second input to gate 37, E-BUS 2 TA bus 18 from CPU 2 at 12 connects to the third input of OR gate 37, and E-BUS 3 TA bus 20 from CPU 3 at 14 connects to the fourth input to OR gate 37. The output of OR gate 37 is bus 36 which is the first input to OR gate 41. Bus 36 is also input to memory controller 45. The second input to OR gate 41 is the output from memory controller 45. The output of OR gate 41 on bus 39 is input to the data input of state device 42. When state device 42 receives the input from OR gate 41, it stores the output for one cycle before providing it at its output.

Conventional arbitration logic and communication between the CPUs exist. This arbitration logic, which can be centrally located or in one or more of the CPUs is necessary to ensure that only one of the CPUs has access to the bus 36 at a time. This logic functions on a request/request-granted type of operation.

The output of state device 42, after passing through driver 43, is input to CPU 0 at 11, CPU 1 at 13, CPU 2 at 12, and CPU 3 at 14 via E-BUS 0 FA bus 21, E-BUS 1 FA bus 23, E-BUS 2 FA bus 22, and E-BUS 3 FA bus 24, respectively. It is understood that the output to the state device is a 32-bit wide output.

Notice that anything applied on the E-BUS x TA buses (where "x" represents any of the bus elements) will show up in the next bus cycle on the E-BUS x FA buses. Therefore, arbitration for the E-BUS x FA buses is done prior to any element transmitting on the E-BUS x TA buses.

As stated, the output of OR gate 37, bus 36, is input to the memory controller 45. The second input to OR gate 41 is the output of memory controller 45. Therefore, the refill data from memory 31 that is on the A-BUS TA bus 35 passes through memory controller 45 for input to the second input of OR gate 41. This data is later caused to be input to state device 42. After processing by the state device, the refill data is supplied to the CPUs via driver 43 and the E-BUS FA buses. This is how refill data operates for a read.

When it is necessary to write data to the memory, data from OR gate 37 on line 36 is coupled through memory controller 45 onto the A-BUS FA 33. No refill data is provided because the data is written to memory.

Figure 3:
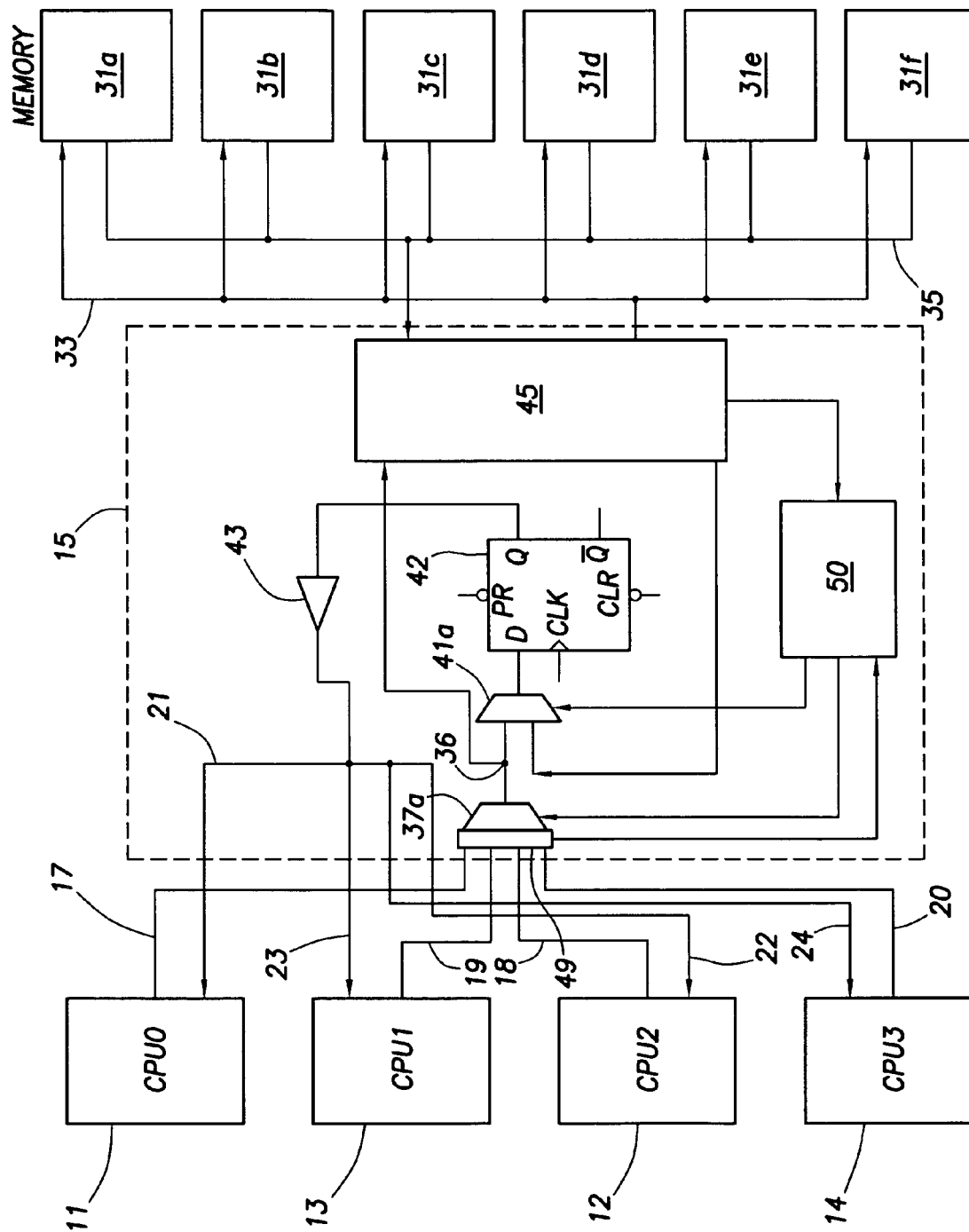
FIG. 3 is a simplified block diagram of a second embodiment using multiplexers.

FIG. 3 is a simplified block diagram of a second implementation incorporated in the system shown at FIG. 1. Here, multiplexers ("MUXes") replace the series of OR gates. According to this implementation, MUXes 37*a* and 41*a* replace the OR gates. As shown in FIG. 3, logic element 50 is also added.

Port logic 49 is disposed at the input to MUX 37*a*. The buffer in port logic 49 can hold up to three words, the number of words being a function of the length of time for the CPU's to recognize a bus grant condition from one of the E-BUS TA buses.

Although most of the signals from the E-BUS TA buses are poised ready for input to MUX 37*a*, there are certain bits from port logic 49 for output to logic element 50. Logic element 50 processes these bits and provides selection inputs to MUXes 37*a* and 41*a*.

Figure 4:
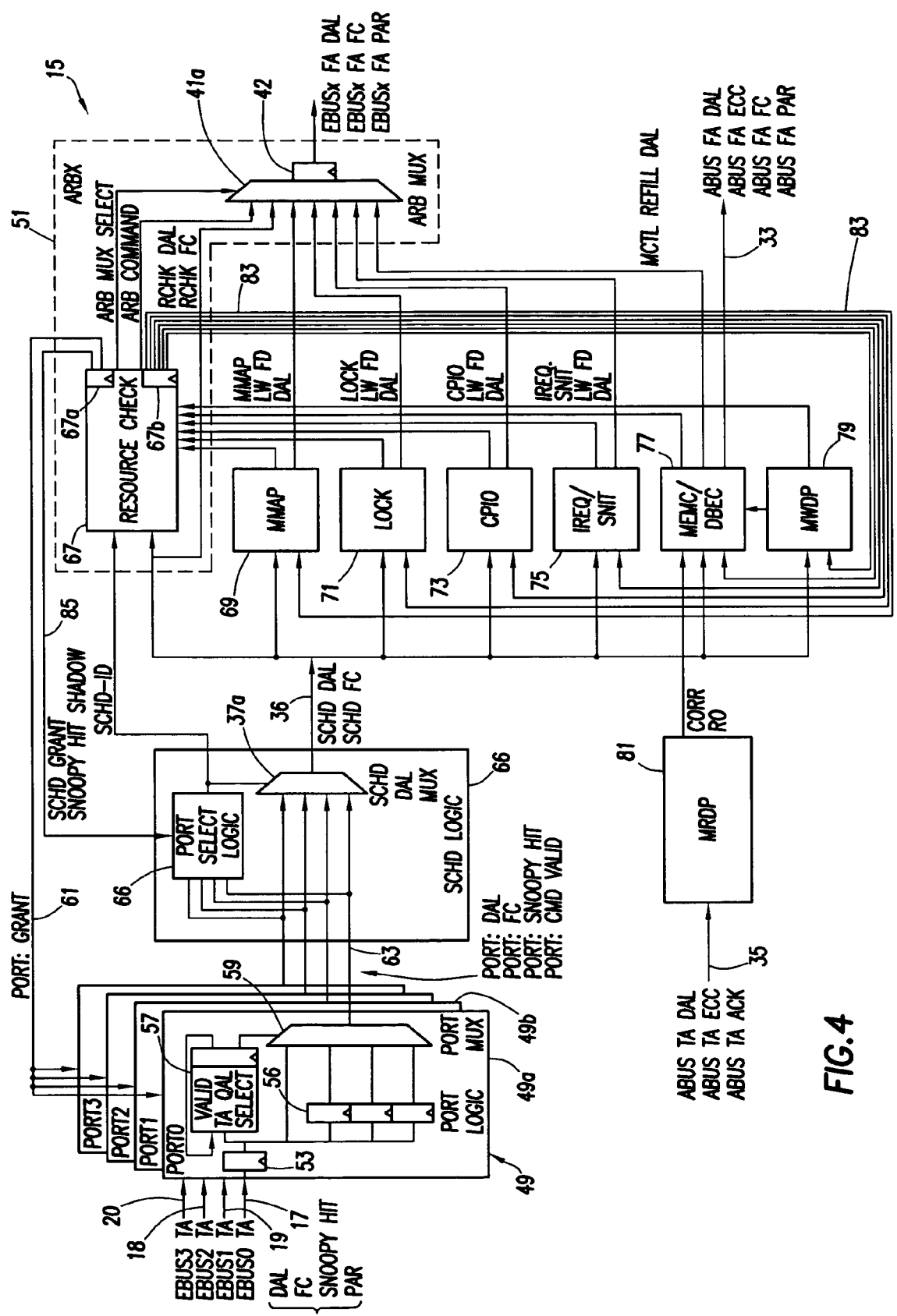
FIG. 4 is a more detailed block diagram of a portion of the central unit shown in FIG. 3.

FIG. 4 is a more detailed block diagram of the central unit 15 of FIG. 3. Logic element 50 in FIG. 3 comprises as part thereof port select logic 65 that is shown in FIG. 4. Port select logic 65 is combined with multiplexer 37*a* to form scheduling logic 66.

Other logic included in the logic 50 of FIG. 3 is resource check logic 67. Resource check logic 67 combines with MUX 41*a* and state device 42 to form arbitrator 51.

Again referring to FIG. 4, E-BUS 0 TA bus 17, E-BUS 1 TA bus 19, E-BUS 2 TA bus 18, and E-BUS 3 TA bus 20 connect to port logic 49. Each of these E-BUS TA buses from one of the CPUs is connected to its own port of port logic 49. For example, E-BUS 0 TA bus 17 connects to port 49*a*, while E-BUS 1 TA 19 connects to port logic 49*b*.

Four types of information may be communicated on the E-BUS TA buses. These types are: (1) data, commands and address information ("DAL"); (2) function code ("FC") information, which are signals to indicate whether the information on the DAL lines is a command, or address or data; (3) "snoopy hit" information, which indicates that a CPU associated with that bus has a "snoopy hit," and (4) parity information.

Although not shown, each of the CPUs may include a cache memory. These memories may be used to speed up access to data which is being used extensively by a CPU. Thus, each time a read command is sent out, each CPU checks to see if the associated address is in its cache. In a manner that will be explained in more detail below, this operation which is known as a "snoopy" operation, is done with timing that insures that any response to a "snoopy" read, which is a "snoopy hit," takes place before refill data returns from one of the memory modules in memory 31.

Again referring to FIG. 4, the information on buses E-BUS 0 TA bus 17, E-BUS 1 TA bus 19, E-BUS 2 TA bus 18, and E-BUS 3 TA bus 20 is input to state device 53. The output of the state device 53 is coupled to MUX 59 and to buffer 55. Buffer 55 can store up to three words of predetermined length.

The output of the state device 53 is also input to validity logic 57. The second input to validity logic 57 is a signal that is fed back from the output of validity logic 57. The other output of validity logic 57 connects to the selection inputs of MUX 59. The PORT GRANT signal on line 61, which is output from arbitrator 51, is also input to validity logic 57.

The function of validity logic 57 is to determine if commands and data are valid, and which of the data, either in buffer 55 or input directly to port MUX 59, are to be switched onto bus 63 at the output port MUX 59.

The output of port MUX 59 on bus 63 is input to MUX 37*a*. The output of port MUX 59 on bus 63 is also input to port select logic 65. MUX 37*a* and port select logic 65 are part of scheduling logic 66.

Port select logic 65, in response to outputs from the arbitrator 51, selects one of the four inputs to MUX 37*a* to be coupled to the output of that MUX. This is coordinated with the operation of validity logic 57 which controls the output of port MUX 59 on bus 63.

Port select logic 65 grants the four ports supplying inputs to bus 63 access to bus 36 on a round robin basis.

Output bus 36 is input to resource check logic block 67 of the arbitrator 51, MUX 41a, and a number of other units. These units are memory map unit ("MMAP") 69, lock logic unit ("LOCK") 71, input/output unit ("CPIO") 73, interrupt request unit ("IREQ/SNIT") 75, memory controller ("MEMC/DBEC") 77, and memory write data path unit ("MWDP") 79. Each of the units 69, 71, 73, 75, and 77 also provide inputs to the MUX 41a.

Resource check 67 receives status inputs from MMAP 69, LOCK 71, CPIO 73, IREQ/SNIT 75, MEMC/DBEC memory controller 77, and MWDP 79. These are the memory module status, the lock register status, the I/O module status, the error status, the memory controller status, and the write buffer status messages. In addition, the resource check logic block 67 generates ARB commands for input to the MUX 41a and a ARB MUX SELECT command for selecting which input will be output from MUX 41a for input to state device 42.

A-BUS TA 35 is a 64-bits wide bus. The signals on that bus comprise DAL information, ECC (error correction code) information, and ACK (acknowledgement) information. The ACK bit is processed by memory read data path ("MRDP") 81. The output of MRDP 81 which includes the DAL and ECC information is input to MEMC/DBEC 77. The DAL information here is generally refill data. The output of MEMC/DBEC is the refill data and this output is one of the inputs to MUX 41a.

MEMC/DBEC 77 also provides an output on A-BUS FA bus 33. This output includes the DAL, ECC, FC, and parity information. This information on A-BUS FA bus 33 is input to memory modules 31a-31f. The output of MUX 41a through the state device 42 includes the same information that MEMC/DBEC 77 put on A-BUS FA 33 except that the ECC information is preferably not included.

When the appropriate command signal on bus 36 is input to resource check logic 67, the resource check logic uses the status information input from MMAP 69, LOCK 71, CP10 73, IREQ/SNIT 75, MEMC/DBEC 77, and MWDP 79 to arbitrate between the different inputs to determine which input will be given access to E-BUS—FA buses 21-24 through MUX 41a and state machine 42. The signals that desire access to these buses are the RSCK DAL and RSCK FC signals on bus 36, MMAP LW RD DAL signal output from MMAP 69, LOCK LW RD DAL signal output from LOCK 71, the CP10 LW RD DAL signal output from CP1O 73, the IREQ/SNIT LW RD DAL output from IREQ/SNIT 75, and the METL REFILL DAL signal output from MEMC/DBEC 77. Resource check logic 67 controls access to these buses via the output lines coupled through state devices 67a and 67b and the ARB MUX SELECT signal output from resource check logic 67.

The outputs from state device 67a on line 61 and 85 are for controlling access of E-BUS TA bus information onto bus 36. The outputs from state device 67b on lines 83 are for causing selected DAL information from MMAP 69, LOCK 71, CP1O 73, IREQ/SNIT 75, and MEMC/DBEC 77 to be input to MUX 41a.

Figure 5:
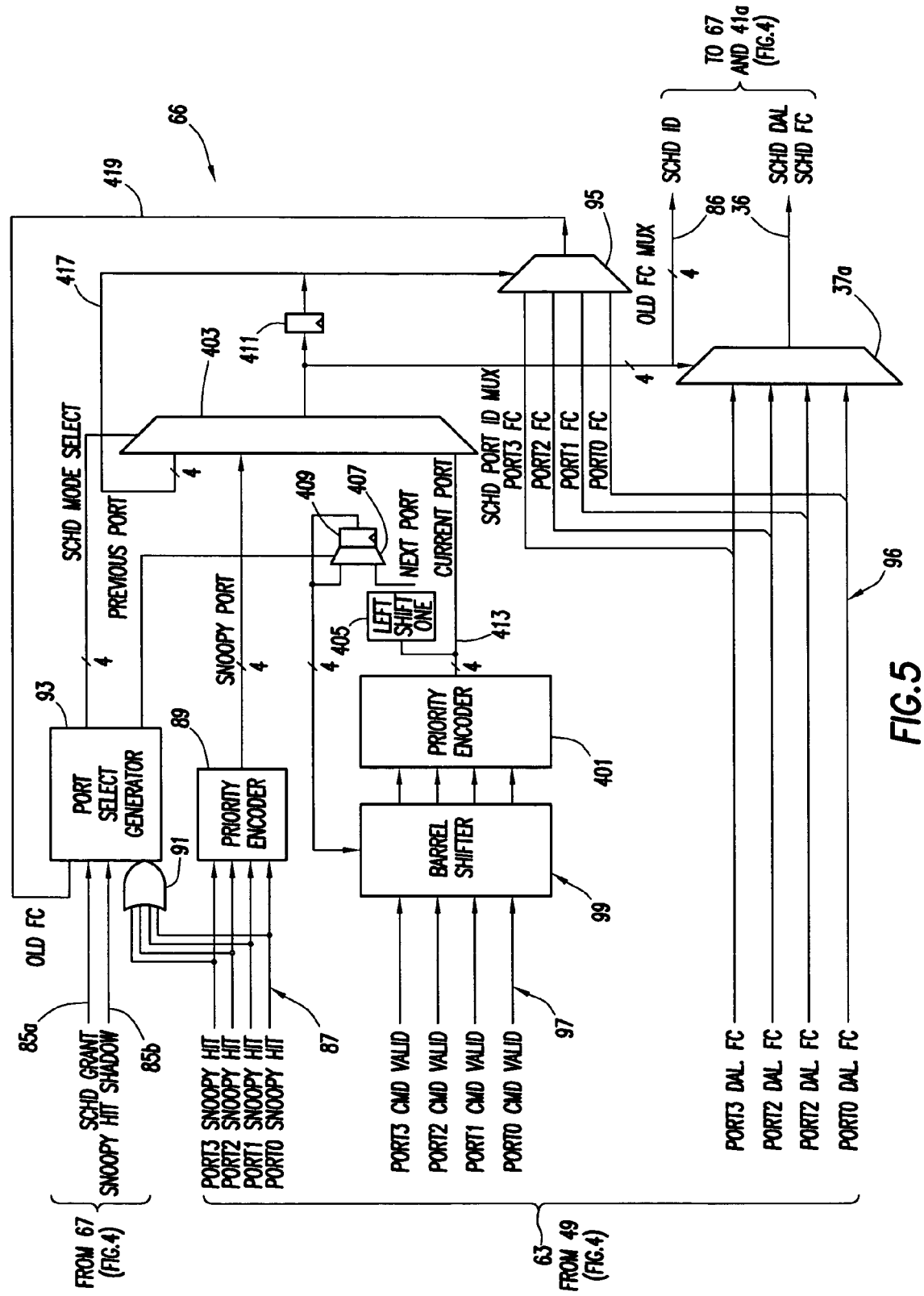
FIG. 5 is a more detailed block diagram of the scheduling logic shown in FIG. 4.

FIG. 5 is a more detailed block diagram of the scheduling logic 66 of FIG. 4. As stated, the scheduling logic includes as major elements port select logic 65 and MUX 37a. The output of the port logic 49 on bus 63 is input to scheduling logic 66. This input includes the port DAL signals, the port FC signals, the port "snoopy hit" signals, and the port CMD VALID (command valid) signals. The selection of which of these signals will be output from port logic 49 is determined by validity logic 57.

Referring to FIG. 5, lines 87 of bus 63 carry the port "snoopy hit" signals. These signals are inputs to priority encoder 89 and OR gate 91. The output of priority encoder 89 is input to MUX 403. The output of OR gate 91 is input to port select generator 93.

Lines 96 of bus 63 carry the DAL and FC signals. These signals are the inputs to MUX 37a. The FC lines signals are also input to OLD FC MUX 95.

Lines 97 of bus 63 carry the port CMD VALID signals. These signals are inputs to barrel shifter 99. The output of barrel shifter 99 is input to priority encoder 401. The 4-bit output of priority encoder 401 is one of the inputs to MUX 403. This 4-bit output is also input to left shift one block 405. The output of left shift one block 405 is one of the inputs to MUX 407. MUX 407 has state device 409 disposed at its output. The output of state device 409 feeds back as the second 4-bit input to the MUX 407 and as a 4-bit control input to barrel shifter 99.

The first 4-bit input to MUX 403 is a feed back signal from state device 411. This is the last input to MUX 403. The 4-bit output of MUX 403 is input to state device 411. The cycle after the output from MUX 403 is input to state device 411, it is provided at the output of the state device. The 4-bit output of state device 411 is also input to the selection inputs of OLD FC MUX 95 which has as inputs the FC signals from lines 96 of bus 63.

The output of MUX 95 on line 419 is the OLD FC signal. This is an input to port select generator 93 along with the output of OR gate 91 and two other inputs. These two other inputs are the SCHD GRANT signal on line 85a and SNOOPY HIT SHADOW signal on line 85b. Both of these signals are output from state device 67a of arbitrator 51. These signals are for controlling access of the E-BUS TA buses to bus 36.

The first output of port select generator 93 is the selection input of MUX 403. The second output is input to the selection input of MUX 407. The control of these two MUXes determines the content of the output from MUX 37a on bus 36 and what the 4-bit SCHD ID signal on line 86 will be. The output of MUX 403 is input to the selection input of MUX 37a whose output is bus 36.

Referring to FIGS. 4 and 5, the operation of the scheduling logic shown at FIG. 5 will now be discussed. Assuming the system is activated and awaiting operating instructions, the port CMD VALID signals on the lines 97 of bus 63 are input to barrel shifter 99. This is the initial action because the first thing to be determined is which commands and data are valid because only those ports having valid commands and data can be granted access to the bus 63. Hence, each port CMD VALID signal is evaluated to determine if it has the proper state indicative of valid commands and data.

Assuming that all four ports have valid commands, priority encoder 401 prioritizes the ports with the highest priority being output first from the priority encoder on line 413 as the "current port" signal. This is also input to left shift one block 405. The output of the left shift one block is the next port in the sequence. So, the output of the left shift one block is the "next port" signal, which is input to MUX 407. The other input to MUX 407 through state device 409 is a feed back signal. This signal also connects to the control inputs to barrel shifter 99. Hence, the signal will cause the barrel shifter to point to the port associated with this signal. The signal that usually is at the feed back loop is the "current port." This is true until changed by the selection of the "next port."

As an example, assume that the priority encoder 401 determines that port "0" should have access to bus 36 first. The 4-bit output of priority encoder 401 is input to left shift one block 405 and, as such, will shift left shift one block to indicate the next port which according to a normal sequence would be port "1."

The output of left shift one block 405 is loaded into the second input to a MUX 407. The first input to MUX 407 is the current port, which is port "0" and is the present output of MUX 407 and latched in state device 409. This signal is fed back to an input of MUX 407. The state device continues to feed back port "0" until the port "0" information has been fully transmitted. This is controlled by port select generator 93 continuing to select the feed back input until port "0" has completed placing its data on bus 36.

When port "0" has completed its transmission, port select generator 93 selects the second input to MUX 407 which is the output of left shift one block 405. This will now provide the "next port" port "1" at the output of MUX 407. On the next cycle, the "next port" signal will be output from state device 409 and fed back to the first input to MUX 407.

When this value designating port 1 is output from state device 409, it is also input to the barrel shifter 99. The new port designation signal advances the barrel shifter by one, so long as the "next port" in the normal sequence order has a valid port CMD VALID signal. If the next port in sequence is not valid, the barrel shifter advances to the next valid port.

The output of the barrel shifter 99 is input to priority encoder 401 which now provides an output representative of the new port. As such, the newly selected port becomes the "current port" and a new "next port" is selected in the above described manner. This method of operation would continue with each port having its turn in round robin fashion.

The output from port select generator 93 that is input to the selection input of MUX 403, usually selects the "current port" input for output from that MUX. This "current port" output will select its signals for output from MUX 37a on bus 36. It is only when other events take place that the other inputs to MUX 403 are selected for output as will be described.

Now that the method by which a port is given access to bus 36 has been described, the operation of scheduling logic 66 will be discussed.

Each command is usually followed by at least one word. This word may be an address, or data (in the case of a refill). This address or data may be followed by additional data (in the case of a write command), a refill command, or a SWAP command (a combined read and write command).

Once a port is given access to the bus, it continues to be given access until it is finished transmitting its commands or data onto bus 36. For example, in the case of a SWAP command, the port has continuous access to send the SWAP command, a read address, a write back command, a write address, and then the write data. During the time that the data and commands are being sent, FC changes states according to what is on the DAL lines. If it is a command, it has one state, and the other state if it is not a command.

The purpose of the MUX 403 is to select between a "previous port," a "snoopy port," and the "current port." As stated, it is only when predetermined events take place that the "previous port" or "snoopy port" inputs to MUX 403 are selected. The method of selecting the output of MUX 403 will now be discussed.

The output of MUX 403 is input to the selection inputs of MUX 37a. This determines which port is granted access to bus 36. Normally, the output of MUX 403 is the "current port"; hence the "current port" is selected at MUX 37a. The "current port" is also input to state device 411. On the clock cycle after the "current port" is input state device 411, with the output therefrom on line 417. This output is input to the selection inputs of OLD FC MUX 95 and fed back as the "previous port" put to MUX 403.

After passage of one cycle, the information being transmitted on the port selected at MUX 37a is data or addresses, and not a command. Accordingly, the FC signal will change states. This new state will be input to port select generator 93. This will cause the SCHD MODE SELECT (scheduling mode selector) output of the generator to have a bit pattern that will select the "previous port" input to MUX 403 which is latched in state device 411. The "previous port" value will remain as the output of MUX 403 until the state of the FC signal on line 419 changes signifying the end of data and the presence of a new command. Port select generator 93 then changes its selection signals to select the "current port" rather than the "previous port." This action ensures that data transmission in complete before another command is placed on bus 36.

In the meantime, in response to the change in state of the FC signal on line 419, the "next port" value is selected at MUX 407. This is done by port select generator 93 changing which output the selection signals selects to be output from MUX 407. Once selected, the "next port" signal, through state device 409, is fed back to MUX 407 and barrel shifter 99. Barrel shifter 99 then selects the next valid port, which now becomes the "current port" on line 413. The scheduling logic 66 now awaits the next change in the state of the selected FC signal for repeating these actions. As an example of the operation of scheduling logic 66, the following is provided.

During normal operations, without a "snoopy hit," when the "current port," e.g., port "0," is selected and coupled through MUX 403, this "current port" signal makes the selection of the "current port" DAL and FC at MUX 37a. On the next clock cycle, this port designation, i.e., port "0," is available at the output of state device 411. The output of state device 411 selects the corresponding port FC signal to be output from MUX 95. Thus, if port "0" is the current port, the FC bit for port "0" will be output from MUX 95 and fed back to port select generator 93.

During the first cycle, which contained a command, the FC bit, for example, may be a logic "1" value. On the second cycle, when other than a command is transmitted, it will change to a logic "0" value.

When the port "0" FC signal switches, this changed value is input to port select generator 93. In response to this change, port select generator 93 will select the "previous port" input that is output from state device 411. Hence, the output of MUX 403 is the "previous port" input. This all results in a holding period so that all of the port "0" information can be transmitted. Once the FC signal changes states to indicate that a command is again being transmitted, the output from port select generator 93 to the selection inputs of MUX 403 will again select the "current port" input, which now is port "1." The process repeats itself for each of the ports taken in round-robin fashion.

The remaining portions to be discussed regarding FIG. 5 relate to granting "snoopy hits" access to bus 36. With regard to normal operations, access of the ports to bus 36 was predicated on the SCHD GRANT (scheduling grant) signal on line 85a from arbitrator 51 having the proper state.

"Snoopy hits" are given priority over normal commands and data. Accordingly, the SNOOPY HIT SHADOW signal, when it has the proper state, will prevent any commands or data from being placed on bus 36.

A "snoopy hit shadow" is a time which covers the period required to obtain signals back from the CPUs when there has been a "snoopy hit." That is, once a read command is put out on the bus, there is a certain amount of time before a signal will come back indicating a "snoopy hit," i.e., the requested data is in a CPU cache. If there is a "snoopy hit," a "snoopy refill command" will occur so the identified data may be provided.

Figure 6:
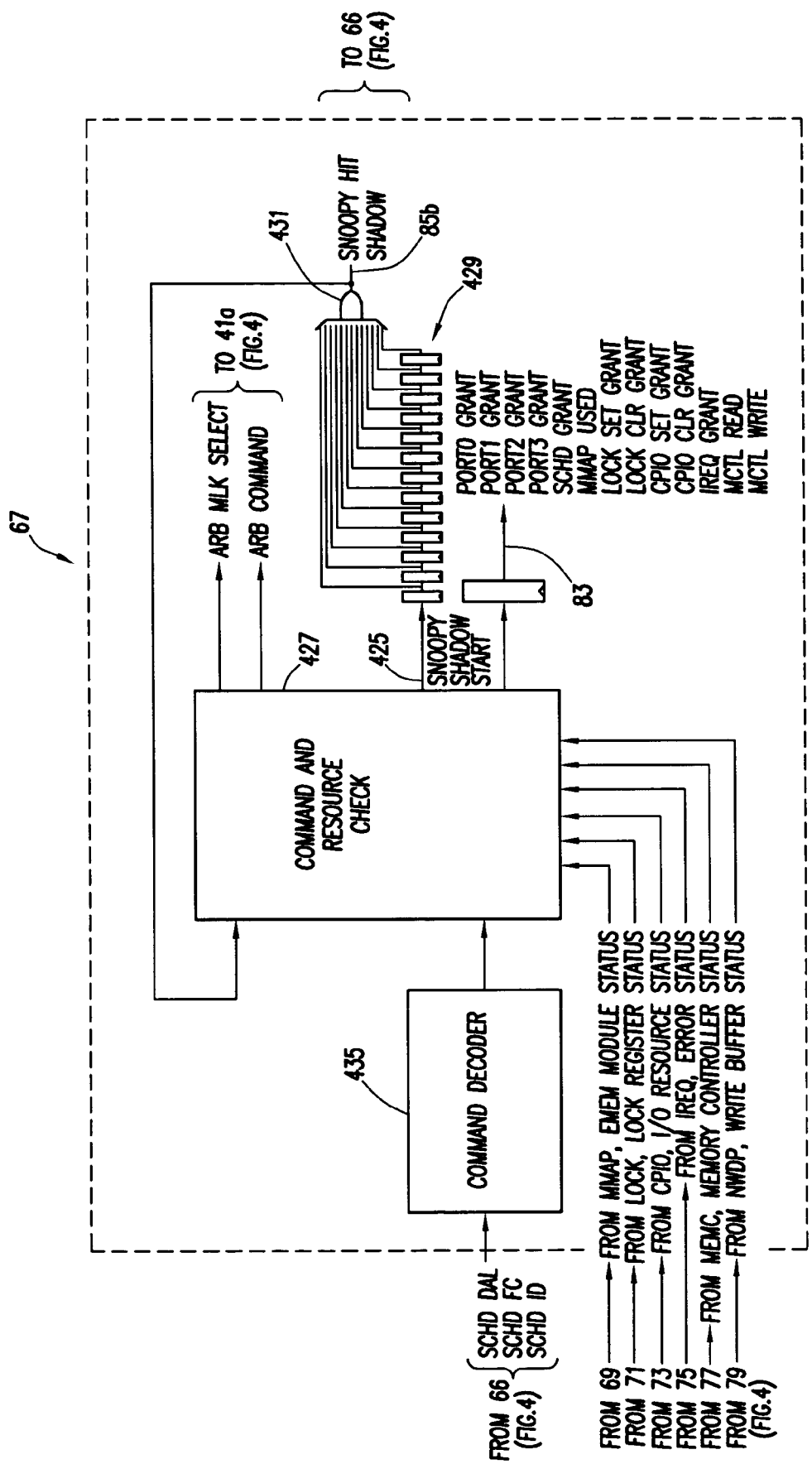
FIG. 6 is a more detailed block diagram of the resource check logic shown in FIG. 4.

FIG. 6 is a more detailed block diagram of resource check logic 67. Referring to this FIGURE and FIG. 5, the method for generating of a SNOOPY HIT SHADOW signal will be discussed.

Once a read command is issued and detected in command decoder 435, a "snoopy shadow" period is started. One of the outputs of command and resource check 427 is the "snoopy shadow start" signal on line 425. This signal is input to multistage shift register 429. The outputs of shift register 429 are combined in OR gate 431. The output of OR gate 431 is fed back to the command and resource check 427 and also is output from resource check logic 67 on line 85b as the SNOOPY HIT SHADOW signal.

Again referring to FIG. 5, during the "snoopy hit shadow" time, any of the ports requesting access to bus 36 cannot be given such access because "snoopy hits" take priority. Only after the "snoopy hit shadow" time has expired, as indicated by the status of the signal on line 85b, will port select generator 93 be enabled to advance to the next port.

If there are more than one "snoopy hit," priority encoder 89 outputs a signal indicative of the "snoopy" port that has been assigned the highest priority.

When there has been a "snoopy hit" identified, the output of OR gate 91 will change state. In response to the change of state of the OR gate 91 output, port select generator 93 selects the correct "snoopy" port for access to the bus 36 through MUX 403 and MUX 37a. That is, the "snoopy port" output from priority encoder 89 will be coupled to the output of MUX 403. This output will select the port corresponding to the correct "snoopy hit" for output through MUX 37a. The selected "snoopy port" will then send out its refill data on bus 36.

Again referring to FIG. 4, command and resource check 427 (not shown), which is part of resource check logic 67, receives status inputs from MMAP 69, LOCK 71, CP1O 73, IREQ/SNIT 75, MEMC/DBEC 77, and MWDP 79. The command from scheduling logic 66 that has been decoded by command decoder 435 is also input to command and resource check 427. This command may be from a particular CPU or port wishing to put a command and address on bus 36. The memory module status outputs from MMAP 69 have the most impact.

As indicated in FIG. 1, there are a number of memory modules (memory modules 31a-31f). In an embodiment of a method of operation, a second read command is not placed on the bus for the same memory module to which a prior active read command has been directed until a predetermined time period has passed. This time period includes memory latency and the time that it takes the memory to provide the refill data.

The nature of the memory control is to control a number of commands that are pending at one time, and yet allow only one command pending for any given memory module. To achieve this preferred type of memory control, command and resource check 427 decodes commands and their associated addresses to determine if it can grant the port requesting access, access to the memory bus based on the number of commands then pending and the availability of a specific memory module.

Again referring to FIG. 4, the ARB MUX SELECT (arbitration multiplexer select) output is input to the selection inputs to MUX 41a. The inputs to MUX 41a are the RSCK DAL and RSCK FC from bus 36, the MMAP LW RD DAL signals from MMAP 69, LOCK LW RD DAL signals from LOCK 71, CP10 LW RD DAL signals CP10 73, IREQ/SNIT LR WD IREQ/SNIT signals 75, and MCTL REFILL DAL signals from MEMC/DBEC 77. Of these inputs, important for consideration is the selection between the RSCK DAL signal output from scheduling logic 66 on bus 36 and the MCTL refill data output from MEMC/DBEC 77. This will be discussed in greater detail with respect to FIG. 10.

For the purposes of discussing selection of the output of MUX 41a, it is understood that if MEMC/DBEC 77 is providing refill data, then none of the ports can be granted access to the bus via MUX 41a. Thus, during the transfer of refill data through the MUX 41a, line 61 and 85 are controlled to ensure that all of the refill data is put onto the E-BUS FA buses 21-24 before a port is given access.

The following are examples of processing commands and data according to embodiments of the present invention and, for example, according to the system shown in FIGS. 3-6.

If one of a number of CPUs wants access to the bus 36, it sends out a command followed by an address in two successive cycles. This command and address will be on E-BUS TA buses 17-20.

There are basic commands which involve memory transfers. These are the read commands, write back commands in which data is written from one CPU to memory, refill commands in which data is written to one CPU from either memory or another CPU, and SWAP command. These commands will be described in conjunction with the appropriate FIGURES.

Figure 7:
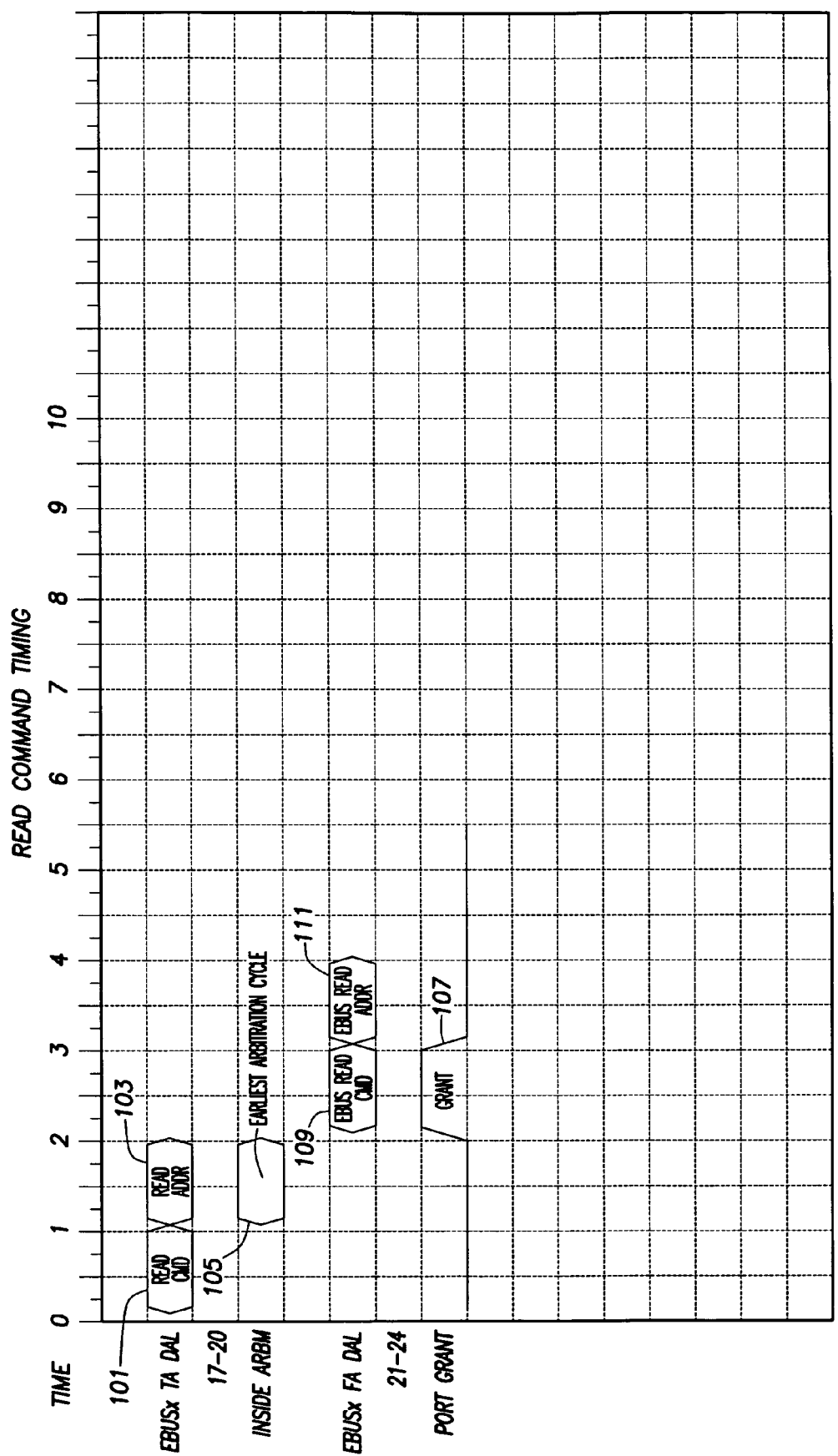
FIG. 7 is a timing diagram for read command timing.

Referring to FIG. 7, a timing diagram for a read command is shown. For the purposes of this example, let it be assumed that CPU 1 is sending out a read command. At the first cycle, CPU 1 sends read command 101 followed by address 103 at the second cycle. At the second cycle, the command is arbitrated as indicated at 105. The arbitration will be between the CPUs competing for access to bus 36. The read command is loaded into the first buffer location of buffer 55 and the read address is loaded into the second buffer location of that buffer (see FIG. 4). Buffer 55 can hold up to three words in its three buffer locations, but only two of those locations are used here.

If the command is valid, as determined by validity logic 57, and the requested memory module is available, at the third cycle, the CPU 1 port is granted access to bus 36 as shown at 107 of FIG. 7. This is done by coupling the read command in the first buffer location of buffer 55 (see FIG. 4) to bus 36 through MUXes 59 and 37a. This command is then coupled through MUX 41a reaching E-BUS FA buses 21-24.

During the next cycle, the address from the second buffer location of buffer 55 in port logic 49 is put on bus 36 as indicated at 111. The read command at 101, which the CPU put on one of the E-BUS TA buses during the first cycle, appears on each of the E-BUS FA buses 21-24 during the third cycle. In this way, the CPU which sent the original command will know, as will all of the other CPUs, that the request has been granted and that the requesting CPU has been given access to bus 36. This is done without the necessity of making a separate communication to each CPU. Also, the read command and address at 101 and 103, respectively, are provided to each of the other CPUs so that they may determine if they have the requested information in their caches for the purpose of a "snoopy hit."

If it is a write command, the first piece of data is sent on a third cycle. The remainder of the data is provided in subsequent cycles. The write command and address will be processed in the same manner as a read command and address. The data, however, will be written to memory and not returned.

Figure 8:
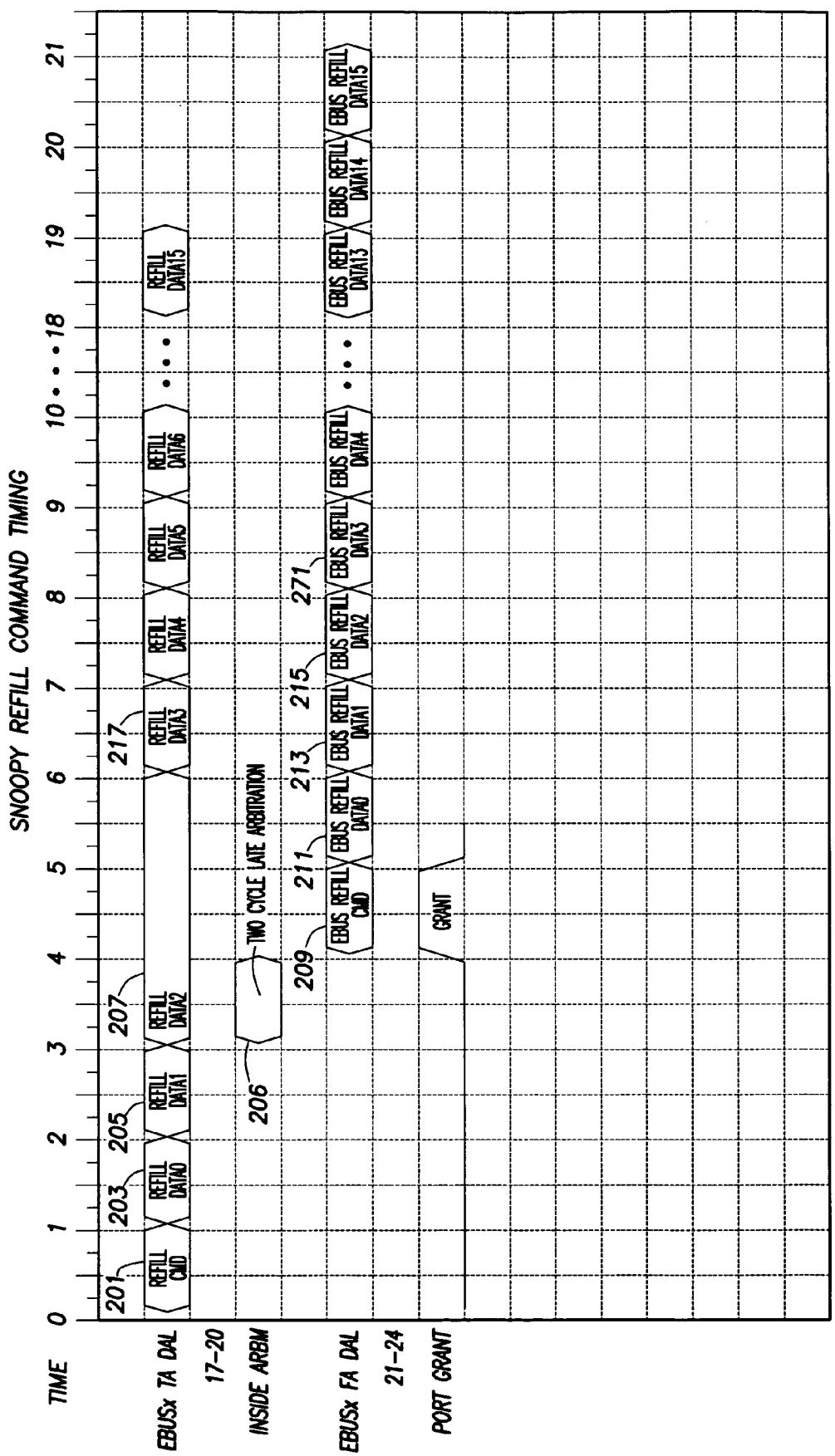
FIG. 8 is a timing diagram for snoopy refill command timing for snoopy hits.

FIG. 8 is a timing diagram for "snoopy" refill command timing. Referring to this FIGURE, the processing of "snoopy hits" will be discussed. As stated, a "snoopy hit" occurs when a CPU has the address associated with a read command in its cache memory. The CPU that has the data in its cache responds to the read command by putting out a "snoopy refill" command followed by refill data on its E-BUS TA bus.

Starting with the first cycle shown in FIG. 8, refill command 201 is output from a CPU and input to the first buffer location of buffer 55 (FIG. 4), then a predetermined number cycles of refill data are output. The data is output at a rate of one byte per cycle. As shown, the first byte of refill data 203 is output at the second cycle and this first byte is input to the second buffer location of buffer 55 (FIG. 4), second byte 205 at the third cycle is input to the third buffer location of buffer 55 (FIG. 4), and third byte 207 at the fourth cycle is held at state device 53 (FIG. 4). The remainder of the data is output at subsequent cycles.

As an example, assume bus 36 was busy when refill command 201 was sent from CPU 3 at 14. As a result, CPU 3 at 14 will have to wait for access to the bus. Accordingly, the refill command, data "0," and data "1," are sent and held in the buffer 55 in port logic 49, as stated, until access is granted. This buffer of port logic 49, as stated, can hold 3 words.

Because the bus was busy, the earliest times at which arbitration can take place is at the fourth cycle. Thus, CPU 3 was given access to the bus 36 two cycles after it asked for it (two cycles late).

In the meantime, at the fourth cycle, the third piece of refill data "2" as 207 has been placed on the bus and is held in state device 53 (FIG. 4) because the buffer can only hold 3 words and, therefore, it is full. Once arbitration takes place at 206 and arbitrator 51 gives CPU 3 access to the bus 36, the refill command is available on all E-BUS FA buses 21-24. This takes place at the fifth clock cycle.

At the fifth cycle, the refill command is latched in state device 42. This refill command, indicated at 209, is transferred from the first buffer location. Similarly, the refill data "0" at 211 is transferred from the second buffer location in buffer 55 and the refill data "1" at 213 is transferred from the third buffer location. At the seventh cycle, the refill data "2" is transferred into the state device 42. It, therefore, is ready for output on the E-BUS FA at the next cycle, as shown at 215.

During the fourth cycle at 206, when arbitrator 51 granted the port access to the bus via line 61, validity logic 57 (see FIG. 4) coupled the input from the first buffer location in buffer 55 (see FIG. 4) through MUX 59. Hence, this input is output from the MUX on bus 63. On the next cycle, the input in the second buffer location of buffer 55 is coupled and in the following cycle, the input in the third buffer location is coupled. After that, the output of state device 53 is coupled through the MUX.

The CPU that sent the refill command and refill data begins sending data again beginning at seventh cycle, as indicated by refill data 217. The refill command was placed on E-BUS FA buses 21-24 at the fifth cycle, as indicated at 209. During the sixth cycle, the CPU 3 read this data and at seventh cycle began sending data again. Now, the two late cycle problem has been corrected. This is why refill data 2 at 207 appears 3 bytes long instead of one byte. This data at 271 appears on the bus 36 just after data 215 as shown. The remaining refill data is passed through without the use of the buffer. The use of embodiments of the buffer and the bus system assures that, once the bus is granted to a CPU, there is a continuous flow of data and commands.

Figure 9:
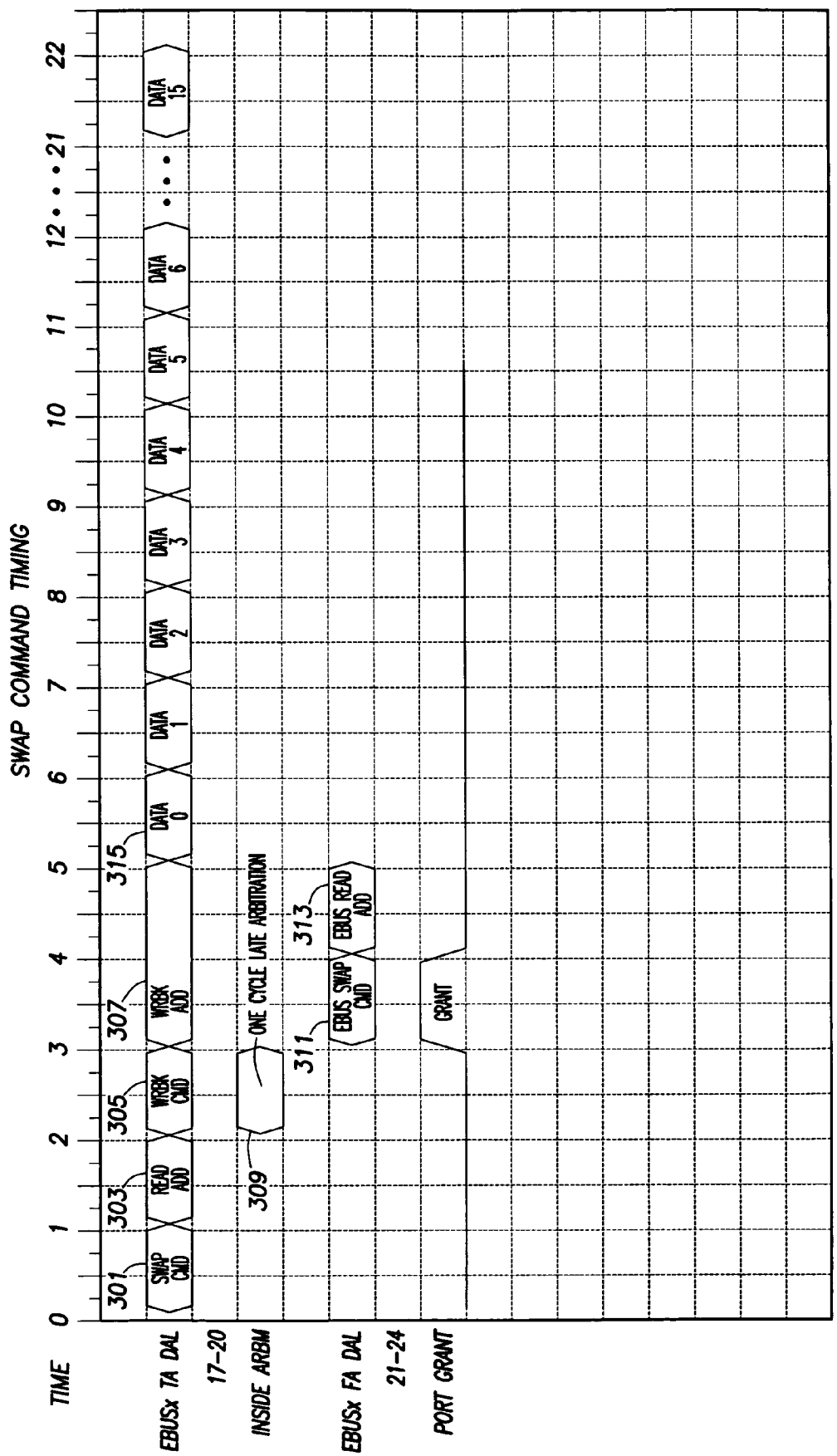
FIG. 9 is a timing diagram for SWAP command timing.

FIG. 9 shows the timing for a SWAP command. SWAP command 301 is input to the first buffer location of buffer 55 at the first cycle and read address at 303 is input to the second buffer location at the second cycle. A write back command at 305 is input to the third buffer location of buffer 55 at the third cycle. At the fourth cycle, the write back address at 307 is held on E-BUS TA bus 18, for example, for CPU 2. The reason it was held here will be explained subsequently.

This diagram shows a one cycle late arbitration. On the cycle after arbitration, the SWAP command appears on the E-BUS FA buses 21-24 at 311 followed by the read address at 313. Similar to the situation in FIG. 5, the sending CPU knows that access has been granted and thus, beginning at sixth cycle time, it can begin sending data again as shown at 315. At this time, the one cycle late arbitration problem is corrected.

Data does not appear on the E-BUS FA buses. This is because the data is being written to memory. Accordingly, the data is coupled from bus 36 directly into the memory controller 45, and it is not coupled through MUX 41a and state device 42 onto the E-BUS FA buses 21-24.

The terms and expressions that are used herein are used as terms of expression and not of limitation. And there is no intention in the use of such terms and expressions of excluding the equivalents of the features shown and described, or portions thereof, it being recognized that modifications are possible in the scope of the invention.

What is claimed is:

1. A system, comprising:
   a central logic unit having a plurality of input ports;
   a plurality of devices wherein each device couples to the central logic unit by first and second unidirectional, point-to-point communication links, said first unidirectional, point-to-point communication link transfers data from the device to the central logic unit and the second unidirectional, point-to-point communication link transfers data from the central logic unit to the device;
   arbitration logic coupled to the plurality of input ports, the arbitration logic permits a request to be transferred through the central logic unit from a device to at least one other device; and
   validity logic coupled to the arbitration logic and that determines whether each request is valid;
   wherein each input port is associated with an input state device, a buffer coupled to the input state device, and a port multiplexer coupled to the buffer and the input state device, and wherein said validity logic couples to the state device and receives a control signal from the arbitration logic, and the validity logic provides an output signal to the port multiplexer.

2. The system of claim 1 wherein said validity logic determines whether a command associated with a request is valid.

3. The system of claim 1 wherein said validity logic determines whether data associated with a request is valid.

4. The system of claim 1, wherein the arbitration logic is part of the central logic unit.

5. The system of claim 1, wherein the arbitration logic comprises a scheduler.

6. The system of claim 1, wherein the devices comprise a plurality of central processing units and a shared memory.

7. The system of claim 1, wherein the system further includes select logic that selects one of the first unidirectional, point-to-point communication links from the devices to be communicatively coupled to an output port.

8. A system, comprising:

a central logic unit comprising a plurality of ports and said central logic unit is adapted to couple to each of a plurality of devices via first and second unidirectional, point-to-point communication links, said first unidirectional, point-to-point communication link transfers data from a device to the central logic unit and the second unidirectional, point-to-point communication link transfers data from the central logic unit to the device; and validity logic that determines whether a request provided by a device to another device is valid;

wherein each input port is associated with an input state device, a buffer coupled to the input state device, and a port multiplexer coupled to the buffer and the input state device, and wherein said validity logic couples to the state device and receives a control signal from arbitration logic, and the validity logic provides an output signal to the port multiplexer.

9. The system of claim 8 wherein said arbitration logic selects a request from a among a plurality of pending requests to be transferred through the central logic unit from one device to at least one other device.

10. The system of claim 8, a device comprises a device selected from a group consisting of a central processing unit and storage.

11. An apparatus, comprising:

a plurality of ports, each port adapted to couple to a device and each port is associated with an input state device, a buffer coupled to the input state device, and a port multiplexer coupled to the buffer and the input state device;

validity logic coupled to the input device;

wherein at least one port connects by way of first and second unidirectional, point-to-point communication links with a device, said first unidirectional, point-to-point communication link transfers data from the device to the central logic unit and the second unidirectional, point-to-point communication link transfers data from the central logic unit to the device; and wherein said validity logic receives a control signal from arbitration logic, and the validity logic provides an output signal to the port multiplexer.

12. The apparatus of claim 11 wherein at least some of said ports are input-only ports, and each input-only port couples to only one device by way of said first and second unidirectional, point-to-point communication links.

13. The apparatus of claim 11 wherein at least some of said ports are output-only ports, and each output-only port couples to only one device by way of said first and second unidirectional, point-to-point communication links.

14. The apparatus of claim 11 wherein said validity logic determines validity of a request from a device.

15. The apparatus of claim 14 wherein said request comprises a command and said validity logic determines whether the command is valid.

16. The apparatus of claim 14 wherein said request comprises data and said validity logic determines whether the data is valid.

* * * * *